United States Patent
Vogl et al.

(10) Patent No.: US 10,833,467 B2
(45) Date of Patent: Nov. 10, 2020

(54) VIBRATION ABSORBING DEVICE FOR SLIP-RING BRUSHES

(71) Applicant: Schleifring GmbH, Fürstenfeldbruck (DE)

(72) Inventors: Christian Vogl, Alling (DE); Jan Rehder, Munich (DE); Peter Heinbuch, Fürstenfeldbruck (DE); Bastian Cording, Breitbrunn (DE); Marvin Doll, Grafrath (DE)

(73) Assignee: SCHLEIFRING GmbH (DE)

( * ) Notice: Subject to any disclaimer, the term of this patent is extended or adjusted under 35 U.S.C. 154(b) by 256 days.

(21) Appl. No.: 16/179,525

(22) Filed: Nov. 2, 2018

(65) Prior Publication Data

US 2019/0190221 A1    Jun. 20, 2019

(30) Foreign Application Priority Data

Nov. 6, 2017    (EP) .................................... 17200075

(51) Int. Cl.
*H01R 39/24* (2006.01)
*H01R 39/18* (2006.01)
(Continued)

(52) U.S. Cl.
CPC ............. *H01R 39/46* (2013.01); *F16F 15/08* (2013.01); *H01R 39/027* (2013.01); *H01R 39/08* (2013.01); *H01R 39/24* (2013.01)

(58) Field of Classification Search
CPC .... H01R 39/02; H01R 39/022; H01R 39/027; H01R 39/08; H01R 39/18; H01R 39/24;
(Continued)

(56) References Cited

U.S. PATENT DOCUMENTS 3,049,637 A * 8/1962 Gutberlet ............. H01R 39/381
310/246
3,824,416 A * 7/1974 van de Griend ....... H02K 5/145
310/51
(Continued)

FOREIGN PATENT DOCUMENTS

CN    202651583 U    1/2013
CN    106797099 A    5/2017
(Continued)

OTHER PUBLICATIONS

China National Intellectual Property Administration, translation of Notification of First Office Action for application 201811309707.5. dated Jun. 11, 2020.

*Primary Examiner* — Edgardo San Martin
(74) *Attorney, Agent, or Firm* — Yakov S. Sidorin; Quarles & Brady LLP

(57) ABSTRACT

A sliding brush assembly for a slipring includes a sliding brush and an absorbing device containing absorbing material attached to the sliding brush, such that the at least one sliding brush is enclosed by the absorbing material. The absorbing device includes a housing with two (optionally identical) housing parts (each having an elongated base with a snap arm at one side and at the opposing side an opening, into which the snap-arm fits). The housing may easily be closed around a sliding brush by snapping two housing parts together.

13 Claims, 6 Drawing Sheets

(51) Int. Cl.
*H02K 13/00* (2006.01)
*H02K 5/14* (2006.01)
*H01R 39/46* (2006.01)
*F16F 15/08* (2006.01)
*H01R 39/02* (2006.01)
*H01R 39/08* (2006.01)
*H01R 39/39* (2006.01)
*H02K 13/10* (2006.01)

(58) Field of Classification Search
CPC .... H01R 39/38; H01R 39/385; H01R 39/388;
H01R 39/39; H01R 39/46; H01R 39/50;
H01R 39/54; H02K 13/00; H02K 13/10;
H02K 5/14; H02K 5/141; H02K 5/145;
H02K 5/148; F16F 15/08
See application file for complete search history.

(56) References Cited

U.S. PATENT DOCUMENTS

| | | | | |
|---|---|---|---|---|
| 3,833,404 | A * | 9/1974 | Sperling | F16F 1/366 428/413 |
| 3,984,716 | A * | 10/1976 | Stark | H02K 9/28 310/232 |
| 4,037,125 | A * | 7/1977 | Aoki | H02K 5/145 310/248 |
| 4,501,983 | A * | 2/1985 | Schmider | H01R 39/40 310/113 |
| 4,758,757 | A * | 7/1988 | Okumura | H01R 39/39 310/239 |
| 4,843,272 | A * | 6/1989 | Mabuchi | H01R 39/39 310/239 |
| 5,151,839 | A * | 9/1992 | Ota | H01R 39/24 360/282 |
| 5,777,405 | A * | 7/1998 | Kurozumi | H01R 39/39 310/244 |
| 6,809,455 | B2 * | 10/2004 | Vaucher | H01R 39/46 310/239 |
| 6,876,121 | B2 * | 4/2005 | Kobayashi | H01R 39/06 310/239 |
| 8,986,053 | B2 * | 3/2015 | Hermann | H01R 4/38 439/792 |
| 9,093,808 | B2 * | 7/2015 | Holzapfel | H01R 39/18 |
| 9,124,055 | B2 * | 9/2015 | Ott | H01R 39/39 |
| 2003/0015934 | A1 | 1/2003 | Kobayashi et al. | |
| 2003/0155836 | A1 * | 8/2003 | Uda | H02K 13/10 310/239 |
| 2018/0069448 | A1 * | 3/2018 | Hirabayashi | H02K 13/10 |
| 2018/0069458 | A1 * | 3/2018 | Hirabayashi | H02K 13/10 |

FOREIGN PATENT DOCUMENTS

| | | | | |
|---|---|---|---|---|
| DE | 3142879 | A1 * | 10/1981 | ............. H01R 39/40 |
| DE | 102009013084 | A1 * | 6/2010 | ............ H01R 39/381 |
| EP | 0645854 | A1 * | 3/1995 | ............. H02K 13/10 |
| EP | 0662736 | A1 * | 7/1995 | ............. H01R 39/64 |
| JP | S50144202 | | 11/1975 | |
| JP | 56139373 | * | 10/1981 | |
| JP | S56139373 | A | 10/1981 | |
| JP | 598275 | * | 1/1984 | |
| JP | S598275 | A | 1/1984 | |
| JP | 61244242 | A * | 10/1986 | ............. H02K 13/10 |
| JP | H01132075 | A | 5/1989 | |
| JP | 05326095 | A * | 12/1993 | |
| JP | 05342543 | A * | 12/1993 | |
| JP | H0993877 | A | 4/1997 | |

* cited by examiner

VIBRATION ABSORBING DEVICE FOR SLIP-RING BRUSHES

CROSS-REFERENCE TO RELATED APPLICATION

This application claims priority from the pending European Application No. 17200075.4, filed on Nov. 6, 2017, the disclosure of which is incorporated herein by reference.

BACKGROUND

1. Field of the Invention

The invention relates to slip-rings and brushes for slip-Rings for transmission of electrical signals between rotating parts. Specifically, it relates to a vibration absorbing and stabilizing device for gold wire brushes.

2. Description of Relevant Art

Electrical slip rings are used to transfer electrical power and/or signals between a rotating and a stationary part. Such slip rings are used in different applications, like wind energy plants or computer tomography scanners. There are also many military and aerospace applications in which slip rings are used.

It is common to all these applications, that a high lifetime and a low contact resistance as well as a low contact noise are required. Furthermore, in specific applications like a CT scanner with high rotation speeds and applications with repetitive high accelerations like robots and pick & place machines specific attention is required. The same applies for specific environmental requirements like in aerospace applications.

Slip rings are generally based on a first part having sliding tracks and a second part having brushes for sliding on the sliding tracks by a rotational movement. Due to external interference or by changes in friction, interfering movements of the brush other than the rotational movement or oscillations of the brush may occur. Specifically, if the excitation mechanism is based on friction effects, the term frictional induced vibration for these interfering movements is used. Such interfering movements may cause contact noise and/or contact interruptions, adversely affecting signal quality. In applications with an inductive load, electrical arcing may occur during such interruptions, which leads to significant corrosion and wear of the brush and the sliding track. As long as minimum arcing voltage and minimum arcing current e.g. 100 mA and 12 V for gold-gold contacts is exceeded also purely ohmic circuits will be subjected to arcing. At lower values still melting can occur with subsequent damage and wear.

EP 066 27 36 A1 discloses a multi-fiber brush where a strand of multiple thin fibers is used for contacting a sliding track. Due to the internal friction between the individual fibers, oscillations are suppressed. The drawback is the complex design having multiple thin wires held by a ferrule, which is expensive and difficult to manufacture. Furthermore, the fiber bundle has a comparatively large diameter and therefore requires a broad sliding track.

SUMMARY

The embodiments achieve a goal of stabilizing a sliding brush and preferably a wire brush for a slipring such that oscillations and/or interfering movements during the operation are reduced. Such stabilization may further lead to a reduction of contact noise, an increase in signal quality, lifetime and reliability of the brush. Related embodiments provide a slipring comprising a stabilized brush and a sliding track. The solution is simple and inexpensive. Preferably, a given embodiment it does not require a change in the design of the already-existing existing brush blocks or slip rings and is usable for retrofitting existing brushes.

In an embodiment, an absorbing device (or absorber, for short) is provided configured to absorb kinetic energy like from vibrations and/or oscillations and/or accelerations preset during the operation of sliding brushes. The absorbing device includes a housing enclosing an elastic absorbing material. The absorbing material is dimensioned to enclose at least a section of a brush and/or to be penetrated by a brush.

The elastic absorbing material may include a polymer, preferably foam, an elastomer or a gel. Furthermore, it is preferred, if the elastic absorbing material is a non-conductive material to provide insulation between neighboring brush wires.

The housing preferably includes an insulating material, preferably a plastic material, most preferably an injection-molded plastic material. Preferably, the housing includes two (optionally identical, structure-wise) parts (that are preferably mating together, preferably by a cantilever snap-fit) configured to hold the elastic absorbing material in between these parts. Each housing part preferably has an elongated base, which preferably has at least one cantilever snap arm, and alternatively two snap arms—at one side and at the opposing side an opening into which the snap-arm fits. Two such housing parts may be snapped together forming the housing.

There may be present at least one fillet, preferably in longitudinal direction, at at least one housing part configured to prevent bending and to increase stability, while keeping the total mass low.

The housing parts may have a groove for holding the elastic absorbing material. Preferably, the elastic absorbing material is inserted or positioned in between the housing parts before snapping the housing parts together. There may be two sheets of elastic absorbing material within the housing, such that the sliding brushes are arranged between the housing parts before snapping the housing parts together. One embodiment contains pre-fabricated housing parts with attached or glued-in elastic absorbing material, such that two of these housing parts simply have to be snapped on at least one sliding brush.

In another embodiment, the absorbing device is attached to a sliding brush thereby forming a sliding brush assembly. Such a sliding brush preferably is a wire brush with a metal wire. The sliding brush has a first end and a second end. The first end may be held by or be attached to a brush block or a brush carrier. The sliding brush further includes a contact section dimensioned to contact a sliding track. The contact section is located preferably between the first end and the second end, most preferably close to the second end. Preferably, under normal operating conditions, the contact section is in mechanical and electrical (galvanic) contact with a sliding track. The absorbing material is configured to enclose at least a section of a brush and/or to be penetrated by the brush.

A brush carrier preferably provides for the brush and an electrical contact to the brush to be mechanically affixed to one another. The brush carrier may include a printed circuit board, a metal piece or a molded plastic part.

Preferably, the brush comprises a metal having spring-elastic properties. Such metal may include at least one of spring steel, brass, bronze, silver, copper, nickel, and alloys or combinations thereof. It may further include any electrical conductive contact material like silver or gold.

In one implementation, the contact section may also include a carbon material. It may include a piece or wire of carbon material connected to the metal wire or a metal wire coated or plated with a carbon material.

The brush may contain metal sheet or wire and the contact section may be an attached metal contact piece with a highly conductive material or the attached contact piece may include metal graphite. The sheet metal brush may be made from sheet metal that includes at least one of spring steel, brass, bronze, silver, gold, copper, nickel, and alloys or combinations. The sheet may have a thickness between 0.05 mm and 3 mm preferably between 0.3 mm and 1.5 mm. The width may be between 1 mm and 20 mm, preferably between 3 mm and 10 mm. The brush may be manufactured with laser cutting, punching and/or bending.

The absorbing device may be held in place by friction with at least one brush. Preferably, the absorbing device is attached to a plurality of parallel brushes (brushes arranged in parallel with one another), to ensure the attenuation of vibrations of individual brushes. It was empirically demonstrated that it is rather unlikely that multiple brushes vibrate similarly (for example, in the same direction and amplitude at the same time). Therefore, the non-vibrating brushes may be employed to provide a comparatively stable support of the absorbing device. Even if many brushes are vibrating, in operation, the absorbing device that preferably is comparatively mechanically stiff is averaging its position between or among the brushes and therefore holding a comparatively stable position. Alternatively, the absorbing device may be attached to a mechanically stable carrier, such as the brush block or a part of the brush block or any other part of the housing.

Preferably, the absorbing device is located between the first end and the contact section. In an embodiment where the brush extends significantly with its second end over the contact section, the absorbing device may also be arranged between the contact section and the second end.

It is further preferred, if the contact section has a surface of a highly-conductive material. Such highly-conductive material may be nickel, silver, gold or any platinoid, a metal chemically resembling platinum, especially osmium, iridium, or palladium. Preferably, the contact section is plated or galvanized, thereby providing a thin gold or gold alloy layer.

In another embodiment, the housing includes a single (monolithic) part.

A further embodiment relates to a slipring brush block which includes a brush carrier, holding at least one or preferably a plurality of slipring brushes as mentioned above. Preferably, the brush carrier includes an insulating material and/or electrically conductive material for electrical contact of the sliding brushes. At least one absorbing device is attached to the at least one brush and/or at least one brush penetrates the absorbing material of the absorbing device.

Another embodiment relates to a slipring assembly and includes a sliding track and a slipring brush block as mentioned above. Preferably, at least one sliding track (or multiple sliding tracks) is held by a body of insulating material forming a slipring module.

The discussed embodiments provide the advantage of having the vibrations and/or oscillations of the brush attenuated or reduced significantly. The absorbing device does not weaken the brush nor does it change the spring properties, thereby maintaining (not changing) contact force to a sliding track. The linear guidance provided by a V-groove in a sliding track is not affected, as there are no side forces to the brush.

In practice, the absorber can easily be attached to existing brushes. This ease of attachment provides a simple solution for retrofitting or upgrading of the existing slipring system without any further modification of it.

A method for adding an absorbing device to at least one slipring brush includes the step of attaching an absorbing device, which contains two housing parts having an elongated base with a snap arm at one side, and at the opposing side—an opening into which the snap-arm fits, and an elastic absorbing material between the housing parts, to at least one slipring brush. The housing may easily be closed around a sliding brush by snapping two housing parts together.

BRIEF DESCRIPTION OF THE DRAWINGS

The invention is further described by way of examples, without limitation of the general inventive concept, and with reference to the drawings.

Figure 1:
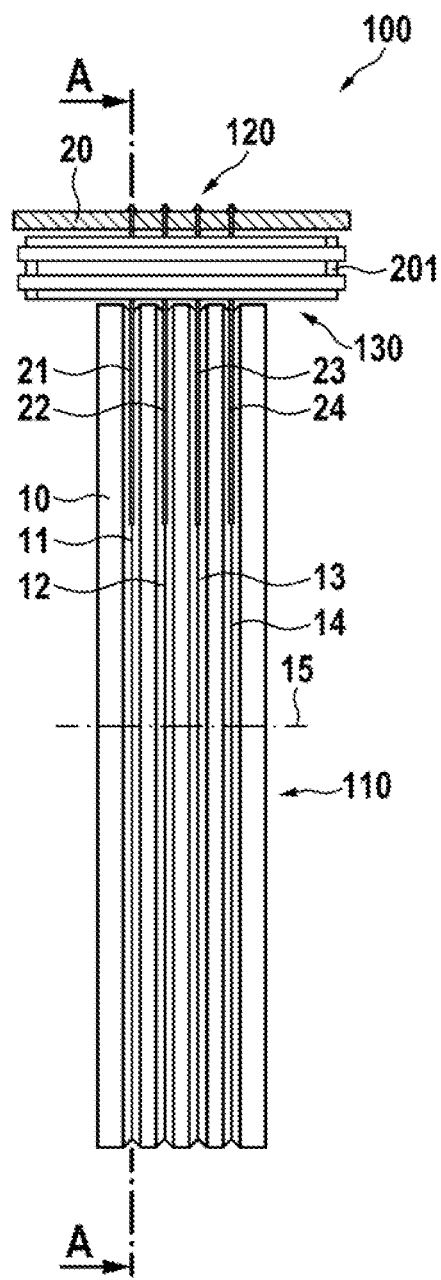
FIG. 1 shows a side view of a slipring assembly.

Implementations of the invention can be variously modified and take alternative forms, with specific embodiments shown in the drawings and described in detail. It should be understood, however, that the drawings and detailed description are not intended to limit the invention to the particular form disclosed, but to the contrary, the scope of the intention is to cover all modifications, equivalents and alternatives falling within the spirit and scope of the present invention as defined by the appended claims.

DETAILED DESCRIPTION

In FIG. 1, a side view of a slipring assembly is shown. A slipring assembly 100 includes a slip-ring module 110 and a slip-ring brush block 120. The slipring module 110 may rotate about the rotation axis 15 and preferably includes an insulating body 10, having a plurality of sliding tracks. Here, four sliding tracks 11, 12, 13, and 14 are shown. In a related embodiment, any other number of sliding tracks may be employed. The sliding tracks are embedded and/or held by the insulating body. Preferably, the sliding tracks are insulated against/from each other. (However, in a related embodiment, there may also be configurations where at least some of the sliding tracks are connected together electrically. This may be useful for transferring higher currents or signals with a lower, reduced noise level.) Here, a preferred embodiment of sliding tracks is shown, which has V-shaped grooves. These V-grooves provide the advantage of guiding wires sliding on the V-grooves and keeping the wires precisely on a predetermined track. However, another type of sliding track may be used instead, such as tracks having multiple grooves or tracks without grooves (for example, tracks having a plane surface).

The slip-ring brush block 120 includes a brush carrier 20, which may include a printed circuit board or any other insulating material. The carrier 20 may also comprise a conducting material like a metal, with insulated portions for holding the brushes. The brush block preferably holds a plurality of sliding brushes. In this embodiment, four wire brushes 21, 22, 23, 24 are shown, but be any other number of brushes and any other kind of brushes. For example, multi-fiber brushes or carbon brushes can be employed. The brushes are spaced apart and dimensioned such that they fit to corresponding sliding tracks of the slip-ring module. There must not necessarily be one brush per sliding track: there may also be a plurality of brushes contacting a given sliding track to increase current capability and/or reduce noise and/or contact resistance. A first absorbing device 201 is provided at the four wire brushes 21, 22, 23, 24, as shown, to reduce vibrations and/or oscillations of the brushes in operation. Depending on the embodiment, the first absorbing device 201 may be dimensioned to only cover a smaller number of brushes (not four, as shown, but three, or two, or one), or there may be multiple absorbing devices, each device covering a smaller number of brushes in a given assembly.

Figure 2:
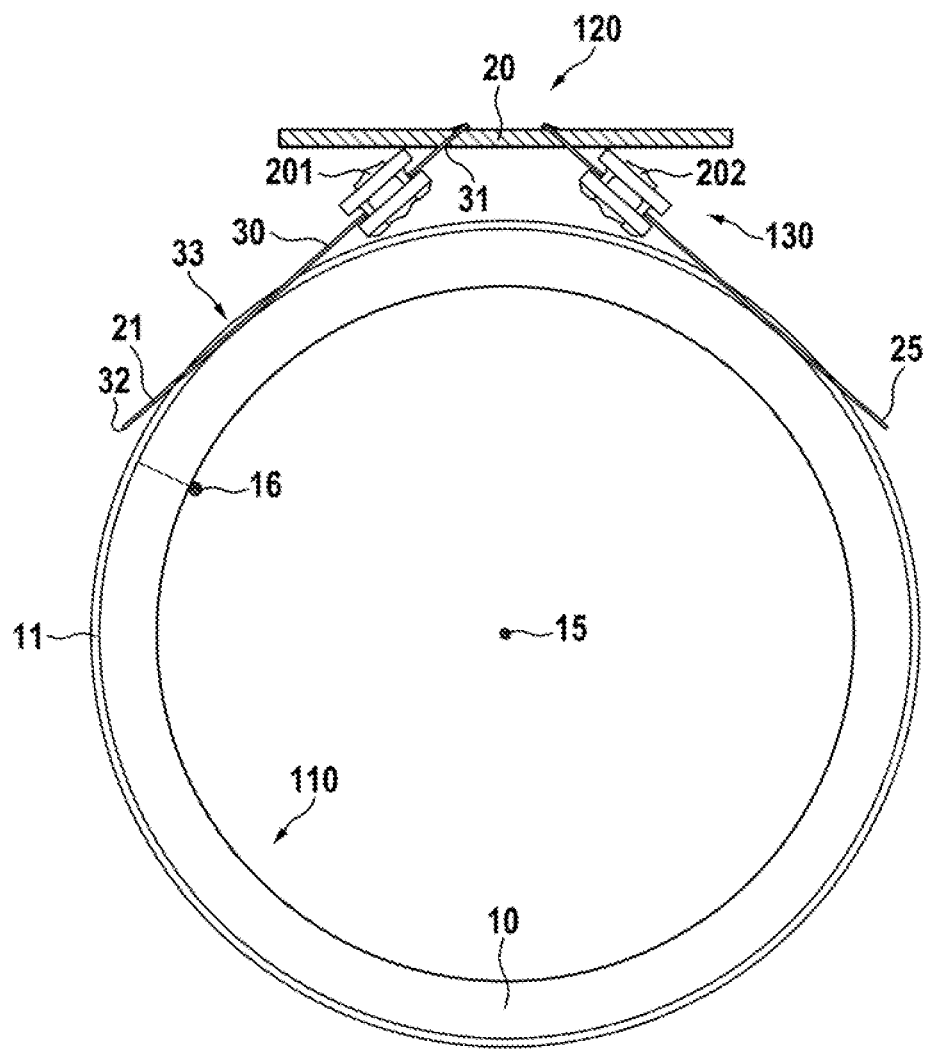
FIG. 2 shows a sectional view of a slipring assembly.

In FIG. 2, a sectional view of the first embodiment is shown in a plane cut through lines A-A, which is transverse to the axis 15 in FIG. 1. It is preferred, if the slip-ring module has a free bore therethrough, for example dimensioned for carrying cables. A connector 16 is shown, which may be a soldering point or soldering pin or a connector, which is in contact with the first sliding track 11. In practice, a connecting cable may be soldered to this connector. Preferably, the other sliding tracks also have connectors to contact the sliding tracks from the inner side of the insulating body. In this embodiment, a first sliding brush 21 and a fifth sliding brush 25 are shown in contact with first sliding track 11. Here, a first absorbing device 201 and a second absorbing device 202 are shown. Furthermore, details of a general sliding brush 30 are shown. The sliding brush 30 has a first end 31, by/at which it is preferably held by a brush carrier 20. Opposing to the first end 31 is a second end 32. Between the first end 31 and the second end 32 there is a contact section 33. This contact section is dimensioned to contact the sliding track. Preferably, the absorbing device 201 is disposed between the first end and the contact section of the sliding brush 30. The absorbing device 202 is shown to be associated with the brush 25.

Figure 3:
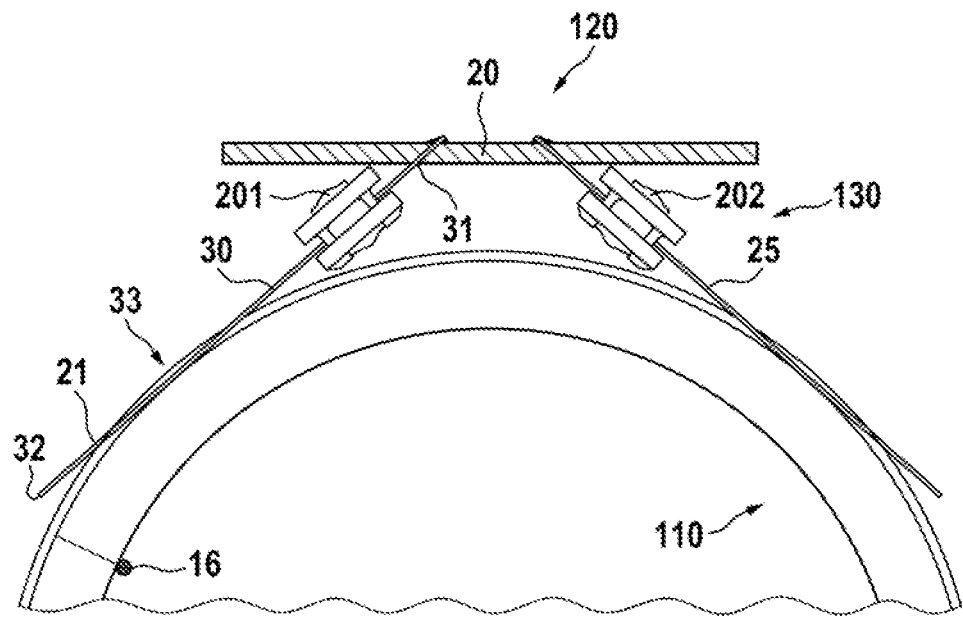
FIG. 3 shows enlarged details of FIG. 2.

In FIG. 3, a detail of FIG. 2 is shown to illustrate the details of the absorbing device(s).

Figure 4:
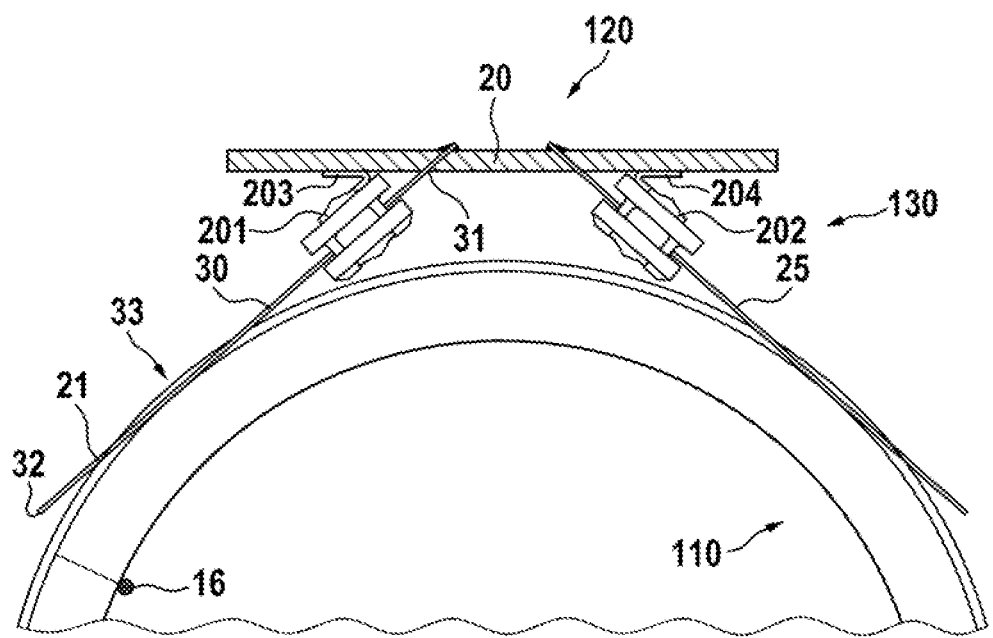
FIG. 4 shows an embodiment with fixation devices.

FIG. 4 shows a slightly modified embodiment of FIG. 3. Here, the absorbing devices 201, 202 are held by a first fixation device 203 and second fixation device 204, respectively, to the brush carrier. (The first and second fixation devices may be clips or assembly brackets.)

Figure 5:
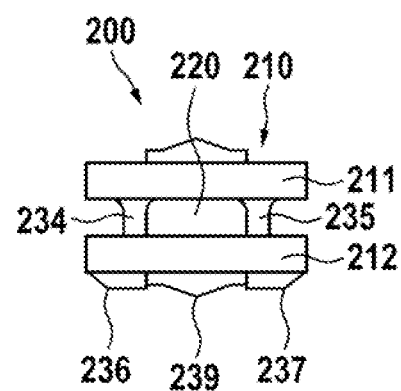
FIG. 5 shows a short side view of an absorbing device.

In FIG. 5 an absorbing device 200 is shown from its shorter side. The absorbing device is shown to have a housing 210, which includes a first housing part 211 and a second housing part 212. Details of the housing parts are illustrated in more detail below.

Figure 6:
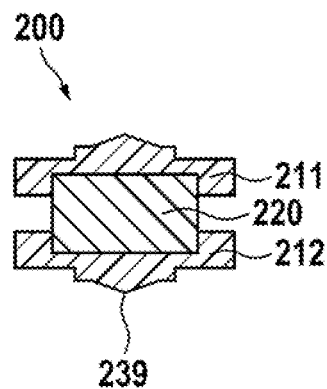
FIG. 6 shows a sectional view.

FIG. 6 shows the device of FIG. 5 in a sectional view, illustrating the elastic absorbing material 220 between the first and second housing parts. The use of fillet 239 is beneficial for larger housing parts, as it increases stability.

Figure 7:
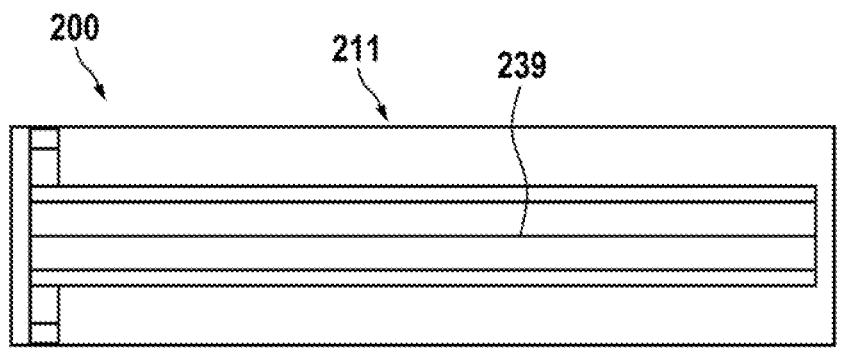
FIG. 7 shows a top view of the absorbing device.

FIG. 7 shows a top view of the absorbing device.

Figure 8:
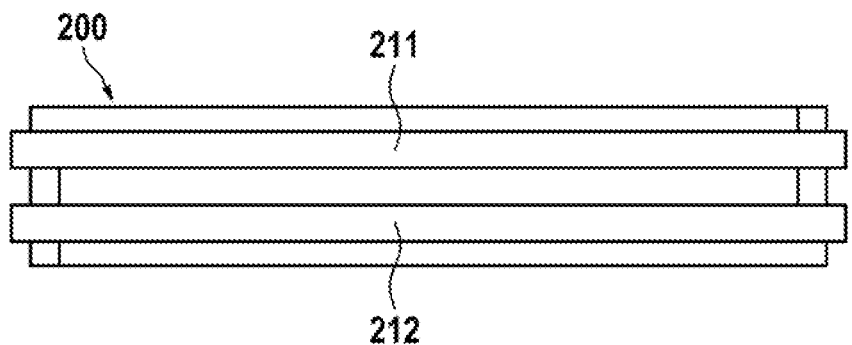
FIG. 8 shows a side view of the absorbing device.

FIG. 8 shows a side view of the absorbing device.

Figure 9:
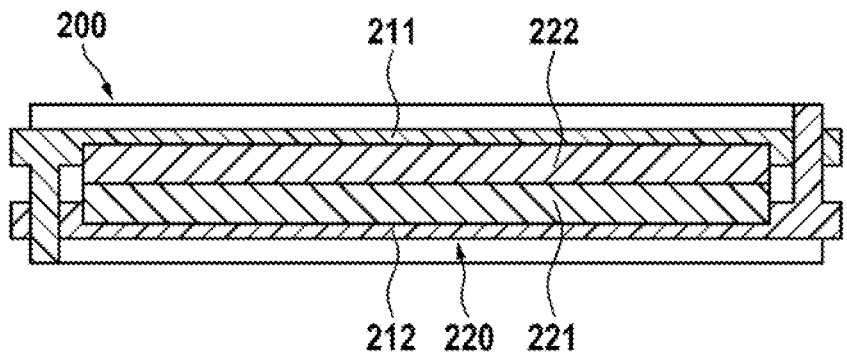
FIG. 9 shows a sectional side view of the absorbing device.

FIG. 9 shows a sectional side view of the specific implementation of the absorbing device. This also shows, how two identical housing parts 211, 212 are connected together to form a housing. For assembly, a second housing part may be placed upside down and rotated about 180 degrees on a first housing part. Here, the elastic absorbing material 220 may include a first layer 221 and a second layer 222. (In related embodiments, there may also be any other number of layers.) Preferably, the absorbing material parts are judiciously dimensioned to enclose the sliding brushes when the housing parts are connected mechanically to the housing.

Figure 10:
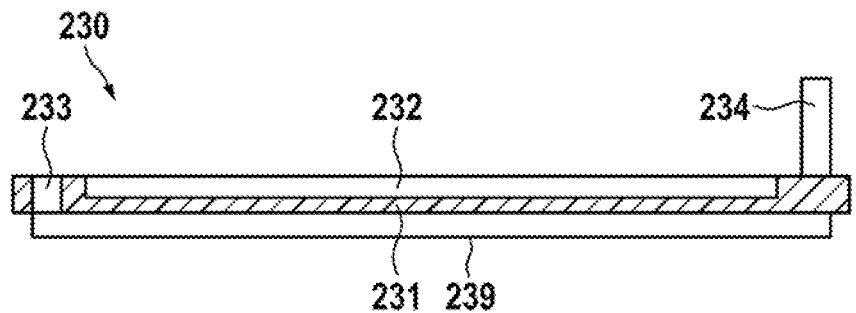
FIG. 10 shows a sectional side view of a housing part.

FIG. 10 shows a sectional side view of a housing part 230. It has a base 231 with a groove 232 dimensioned to hold the elastic absorbing material (not shown here) and a fillet 239 configured to increase mechanical stability. For assembly with another housing part to form a housing, cantilever snap arms 234, 235 at one side and a matching opening 233 at the other side are provided.

Figure 11:
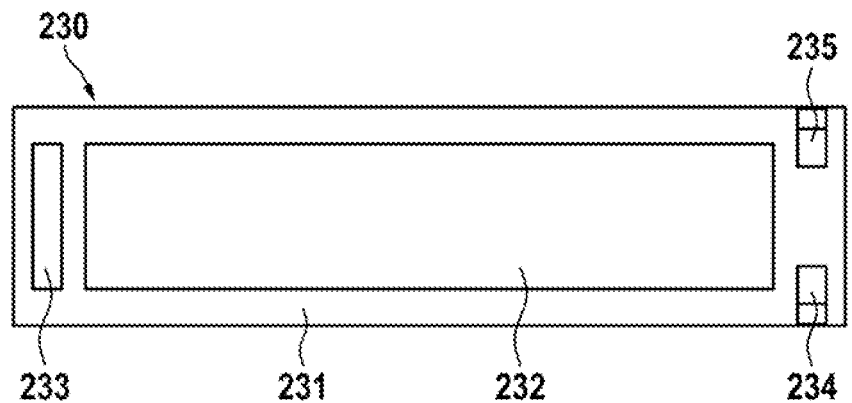
FIG. 11 shows a top view of a housing part.

FIG. 11 shows a top view of the housing part 230.

Figure 12:
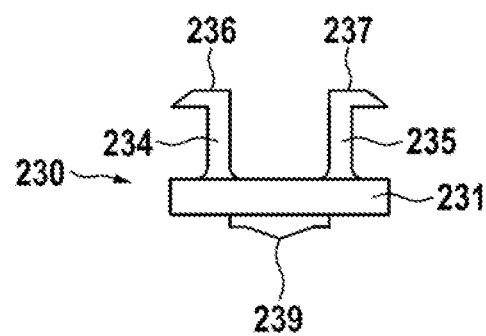
FIG. 12 shows a front view of a housing part.

FIG. 12 shows a front view of the housing part 230. Here, the first cantilever snap arm 234 having a first projection 236 and the second cantilever snap arm 235 having a second projection 237 are shown.

It will be appreciated by those skilled in the art having the benefit of this disclosure that embodiments of this invention are believed to provide sliprings and components thereof. Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

LIST OF REFERENCE NUMERALS 10 insulating body
11 first sliding track
12 second sliding track
13 third sliding track
14 fourth sliding track
15 rotation axis
16 connector
20 brush carrier
21 first sliding brush
22 second sliding brush
23 third sliding brush
24 fourth sliding brush
25 fifth sliding brush
30 sliding brush
31 sliding brush first end
32 sliding brush second end
33 contact section
100 slip-ring assembly
110 slip-ring module
120 slip-ring brush block
130 sliding brush assembly
200 absorbing device 201 first absorbing device
202 second absorbing device
203 first fixation device
204 second fixation device
210 housing
211 first housing part
212 second housing part
220 elastic absorbing material
221 first absorber section
222 second absorber section
230 housing part
231 base
232 groove
233 opening
234 first cantilever snap arm
235 second cantilever snap arm
236 first projection
237 second projection
239 fillet

The invention claimed is:

1. A sliding brush assembly for a slipring, the assembly comprising:
    at least one sliding brush comprising a first end at which the at least one sliding brush is held, a second end opposite to the first end, and a contact section of the at least one sliding brush between the first end and the second end, the at least one sliding brush further comprising a metal wire or a metal sheet,
    an absorbing device configured to reduce at least one of vibrations and oscillations and attached to the at least one sliding brush, the absorbing device comprising a housing enclosing an elastic absorbing material,
    wherein at least one of the following conditions is satisfied:
    (a) at least a section of the at least one sliding brush is enclosed by the absorbing material, and
    (b) the absorbing material is penetrated by the at least one sliding brush.

2. The sliding brush assembly according to claim 1, wherein
    the elastic absorbing material comprises a polymer.

3. The sliding brush assembly according to claim 1, wherein
    the elastic absorbing material comprises at least one of a foam, an elastomer, and a gel.

4. The sliding brush assembly according to claim 1, wherein
    the absorbing device is attached to the at least one sliding brush between the first end and the contact section.

5. The sliding brush assembly according to claim 1, wherein
    the housing includes an elastic absorbing material.

6. The sliding brush assembly according to claim 5, wherein the elastic absorbing material includes at least one of a foam, an elastomer, and a gel.

7. The sliding brush assembly according to claim 1, wherein
    the housing includes two housing parts, each having an elongated base with a snap arm on one side and an opening on another side, the opening being dimensioned to accommodate the snap-arm.

8. The sliding brush assembly according to claim 7, wherein
    the elongated base has a groove configured to hold the elastic absorbing material.

9. The sliding brush assembly according to claim 7, wherein
    a housing part, from the two housing parts, includes a sheet of an additional elastic absorbing material.

10. The sliding brush assembly according to claim 9, wherein
    the sheet of the additional elastic absorbing material is glued or molded to said housing part from the two housing parts.

11. The sliding brush assembly according to claim 7 wherein
    at least one housing part, from the two housing parts, includes at least one fillet.

12. A slipring brush block comprising at least one sliding brush assembly according to claim 1.

13. A slipring assembly comprising a slipring module that includes at least one sliding track and a slipring brush block according to claim 11.

* * * * *